(12) United States Patent
Johnson et al.

(10) Patent No.: US 9,468,318 B2
(45) Date of Patent: Oct. 18, 2016

(54) ROTARY PILLOW WHOMPER

(71) Applicant: American Textile Company, Duquesne, PA (US)

(72) Inventors: John M. Johnson, Grantsville, UT (US); Jesse A. Zipf, Pittsburgh, PA (US); Keith M. Brown, Homestead, PA (US)

(73) Assignee: AMERICAN TEXTILE COMPANY PA (US)

( * ) Notice: Subject to any disclaimer, the term of this patent is extended or adjusted under 35 U.S.C. 154(b) by 0 days.

(21) Appl. No.: 14/494,884

(22) Filed: Sep. 24, 2014

(65) Prior Publication Data

US 2016/0081499 A1    Mar. 24, 2016

(51) Int. Cl.
*A47G 9/10* (2006.01)
*B65G 15/14* (2006.01)
*B65G 21/20* (2006.01)
*B65G 15/00* (2006.01)

(52) U.S. Cl.
CPC ............... *A47G 9/10* (2013.01); *B65G 15/14* (2013.01); *B65G 21/2072* (2013.01); *B65G 15/00* (2013.01)

(58) Field of Classification Search
CPC  B65G 15/14; B65G 21/2072; B65G 21/209; B68G 7/06; B68G 7/12; B68G 15/00; B68G 15/005
See application file for complete search history.

(56) References Cited

U.S. PATENT DOCUMENTS

| | | | |
|---|---|---|---|
| 1,503,352 A * | 7/1924 | Droll | B68G 15/005 15/89 |
| 3,684,254 A | 8/1972 | Henry | |
| 3,805,317 A * | 4/1974 | Dickinson | B08B 5/023 15/308 |
| 4,664,160 A | 5/1987 | Rothstein et al. | |
| 5,103,879 A | 4/1992 | Hickerson | |
| 5,190,082 A | 3/1993 | Watson et al. | |
| 6,860,092 B2 | 3/2005 | Collida et al. | |
| 7,270,631 B2 | 9/2007 | Franklin et al. | |
| 7,380,575 B2 | 6/2008 | Stricklin | |
| 8,281,819 B2 | 10/2012 | Dillon | |
| 8,578,973 B2 | 11/2013 | Dillon | |
| 2008/0289303 A1* | 11/2008 | Nemkov | B29C 65/18 53/552 |
| 2009/0159405 A1* | 6/2009 | Williams | G07B 17/00467 198/617 |
| 2010/0170206 A1 | 7/2010 | Kim | |

FOREIGN PATENT DOCUMENTS

CN           203653228 U  *  6/2014  ............... B68G 7/06

OTHER PUBLICATIONS

Abstract of CN 203653228 U, Jun. 2014.*

* cited by examiner

*Primary Examiner* — Mark A Deuble
(74) *Attorney, Agent, or Firm* — H. Jay Spiegel

(57) ABSTRACT

A machine has a frame on which is mounted a conveyor mechanism including two vertically spaced belts between which the spacing is provided to allow a pillow to travel between the belts. To each side of the conveyor belt, a beater is provided. The beaters are rotatably mounted on the frame about shafts defining their axes of rotation. The two beaters rotate in opposite directions and include peripheries defined by two opposed elongated bars substantially parallel to the axis of rotation of the beater. A pillow is fed between the conveyor belts and as it traverses the location where the beater mechanism is located, the beaters sequentially strike the pillow on each side simultaneously to beat the pillow casing and the fiber within, therefore efficiently distributing the fiber fill throughout the pillow casing, removing and lumping, uneven spots, empty areas, and causing the pillow to become more lofty, softer, and completely filled out.

20 Claims, 4 Drawing Sheets

US 9,468,318 B2

ROTARY PILLOW WHOMPER

BACKGROUND OF THE INVENTION

The present invention relates to a rotary pillow whomper. Pillows are manufactured in a mass production manufacturing line in which the pillow casing is provided, stuffed with a stuffing, closed, fluffed, and packaged. Many pillows are stuffed with a filling that consists of a fiber filling. Such a filling tends to clump and concentrate in a variety of areas within the pillow casing. The result is a pillow with corners that appear empty or not filled with fiber as well as lumpy due to uneven fiber distribution. Such a pillow is unattractive when it is sold to the consuming public.

This problem is well recognized in the pillow manufacturing industry and manufacturers have attempted different ways to resolve the issue. One way the issue is resolved is manually. Simply, a person on the manufacturing line takes manufactured pillows and grasps the corners of each pillow and swings it against a hard surface to distribute the fiber filling. This method is labor intensive and adds significant costs to the pillow. It is also an inconsistent solution to the problem.

It would be advantageous to provide a device that could mechanically uniformly distribute fiber filling throughout the casing of a pillow, thereby evenly distributing the fill and rendering a pillow more aesthetically pleasing to the consumer. An added result is a pillow that appears more lofty and is softer.

The following prior art is known to Applicant:

U.S. Pat. No. 3,684,254 to Henry and U.S. Published Application No. U.S. 2010/0170206 A1 to Kim disclose devices including vibratory mechanisms to facilitate settling of goods packaged in flexible containers. Neither of these references teaches a mechanism similar to that of the present invention. Applicant is also aware of U.S. Pat. No. 7,270,631 to Franklin et al. which discloses a mechanism including two counter-rotating devices designed to tuck side panels into a body portion of a pant-like garment. This differs significantly from the teachings of the present invention.

Additional references are known to Applicant which are designed to fill goods including pillows. U.S. Pat. No. 4,664,160 to Rothstein et al., U.S. Pat. No. 5,103,879 to Hickerson, U.S. Pat. No. 5,190,082 to Watson et al., U.S. Pat. No. 6,860,092 to Collida et al., U.S. Pat. No. 7,380,575 to Stricklin, U.S. Pat. No. 8,281,819 to Dillon, and U.S. Pat. No. 8,578,973 to Dillon teach such devices. None of these patents teaches or suggests the structure and function of the present invention.

SUMMARY OF THE INVENTION

The present invention relates to a rotary pillow whomper. The present invention includes the following interrelated objects, aspects and features:

(1) In a first aspect, the present invention comprises a machine that has a frame on which is mounted a conveyor mechanism. The conveyor mechanism includes two vertically spaced belts between which the spacing is provided to allow a pillow to travel between the belts. The belts have a width that is greatly exceeded by the width of the pillow that is traveling between them.

(2) A beater mechanism is provided on both sides of the conveyor mechanism. The beater mechanism has a beater to each side of the conveyor mechanism rotatably mounted on the frame about a shaft defining its axis of rotation. The two beaters rotate in opposite directions and include peripheries defined by two opposed elongated bars substantially parallel to the axis of rotation of the beater.

(3) In the preferred embodiment, the inventive device has one motor that operates the conveyor belts, and another motor that operates the beater mechanism. Each motor is coupled to its associated device by a drive mechanism consisting of chains and gears.

(4) In the operation of the present invention, a pillow is fed between the conveyor belts and as it traverses the location where the beater mechanism is located, the beaters rotate with their opposed elongated bars sequentially striking the pillow on each side simultaneously to beat the pillow casing and therefore efficiently distribute the fiber fill throughout the pillow casing, removing any lumping and causing the pillow to become more lofty and softer.

As such, it is a first object of the present invention to provide a rotary pillow whomper.

It is a further object of the present invention to provide such a device in which a conveyor belt mechanism includes belts vertically spaced from one another a distance permitting a pillow to travel between the belts.

It is a still further object of the present invention to provide such a device in which a beater mechanism has two laterally spaced beaters rotated in opposite directions to strike a pillow on its sides to distribute fiber fill and reduce lumping, and create a loftier pillow.

It is a further object of the present invention to provide such a device in which each beater includes two laterally spaced elongated bars that sequentially beat the pillow as it traverses the conveyor belt mechanism.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
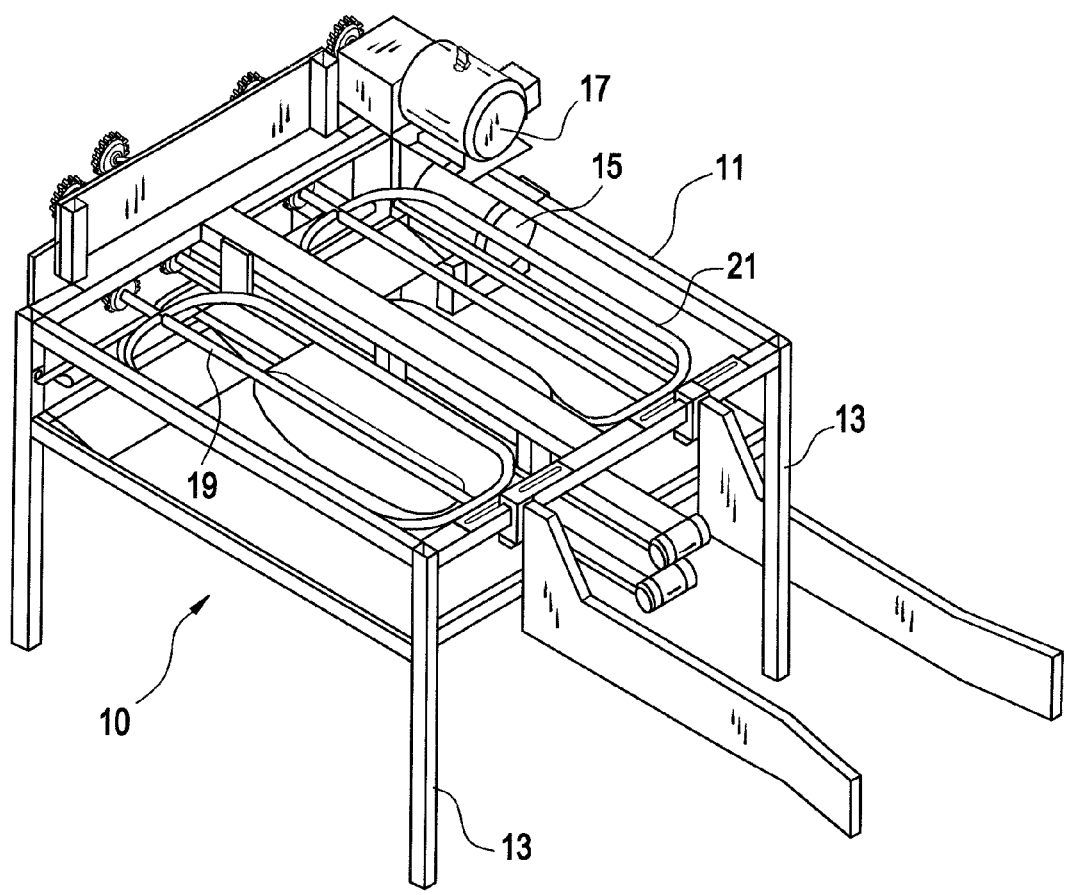
FIG. 1 shows a perspective view of the present invention.
Figure 2:
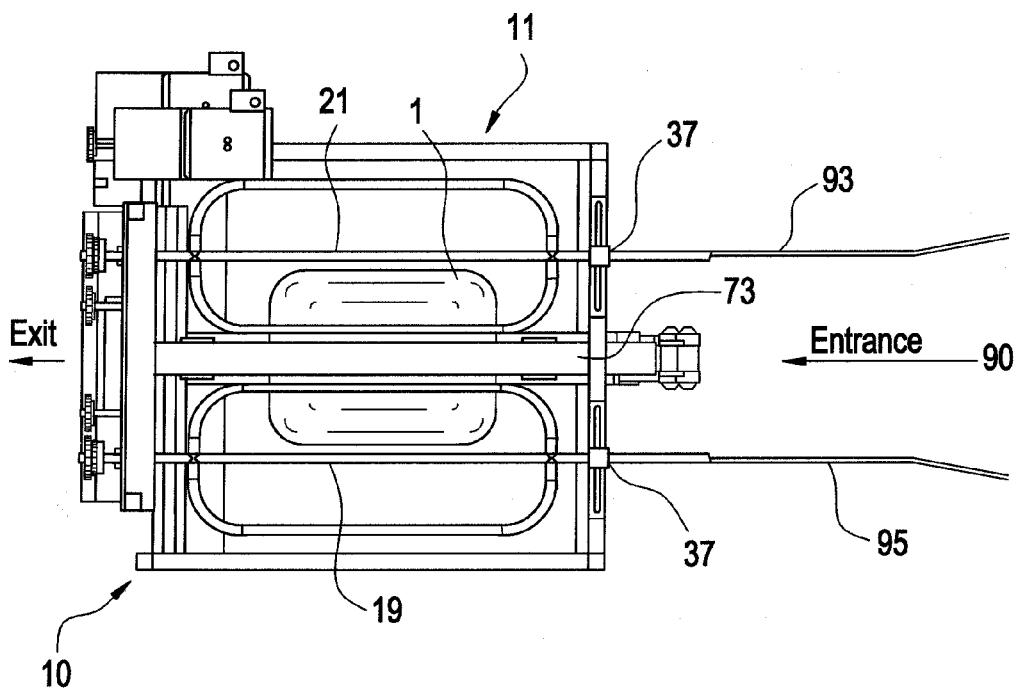
FIG. 2 shows a top view of the present invention.
Figure 3:
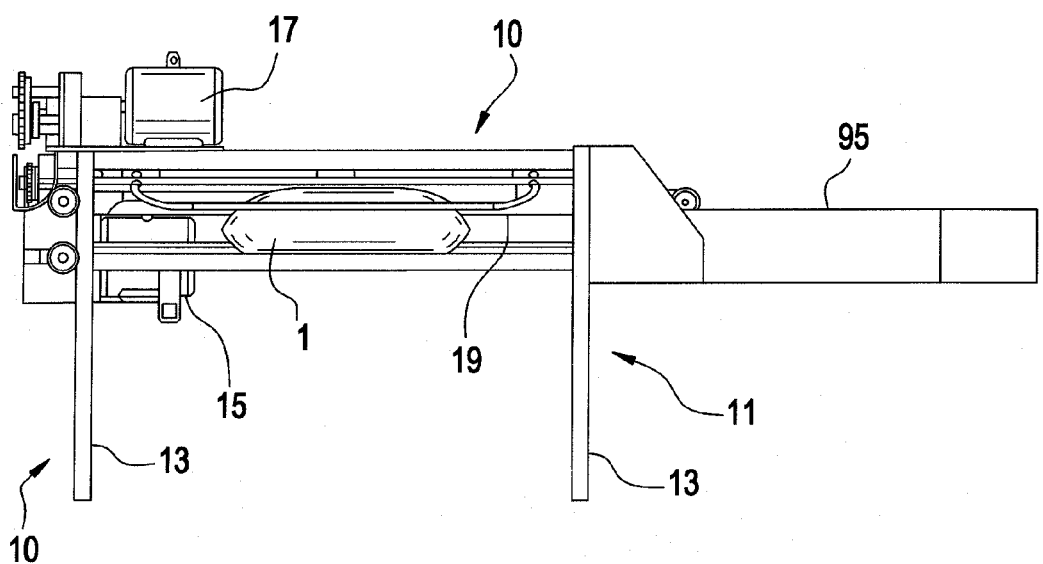
FIG. 3 shows a side view of the present invention.
Figure 7:
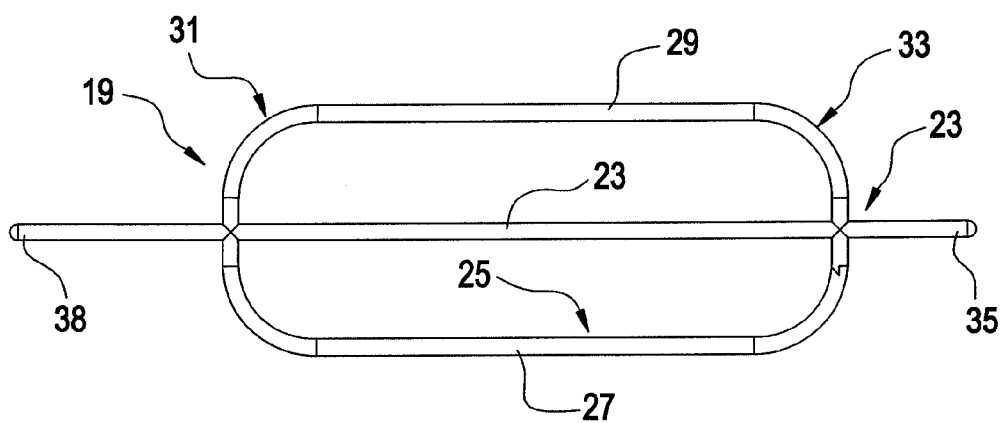
FIG. 7 shows a top view of one of the beaters of the present invention.

With reference first to FIGS. 1-3, the present invention is generally designated by the reference numeral 10 and includes a frame 11 having legs 13 supporting the components of the present invention. As seen in FIG. 1, a first motor 15 drives the conveyor mechanism as will be described in greater detail hereinafter, and a second motor 17 drives the beater mechanism as will be described in greater detail hereinafter. The beater mechanism includes two beaters 19 and 21. With reference to FIG. 7, the beater 19 (which is identical to the beater 21) will now be described.

The beater 19 includes an elongated shaft 23 on which is mounted an oval-shaped device 25 that consists of two parallel rods 27, 29 interconnected by curved sections 31 and 33. The curved sections 31 and 33 are coupled to the shaft 23 and the rods or bars 27 and 29 are preferably parallel to the shaft 23. The shaft 23 includes a first end 35 that is received within a bearing 37 (not clearly shown in FIG. 2), and a second end 38 on which is mounted a sprocket 39 (FIG. 6).

Figure 6:
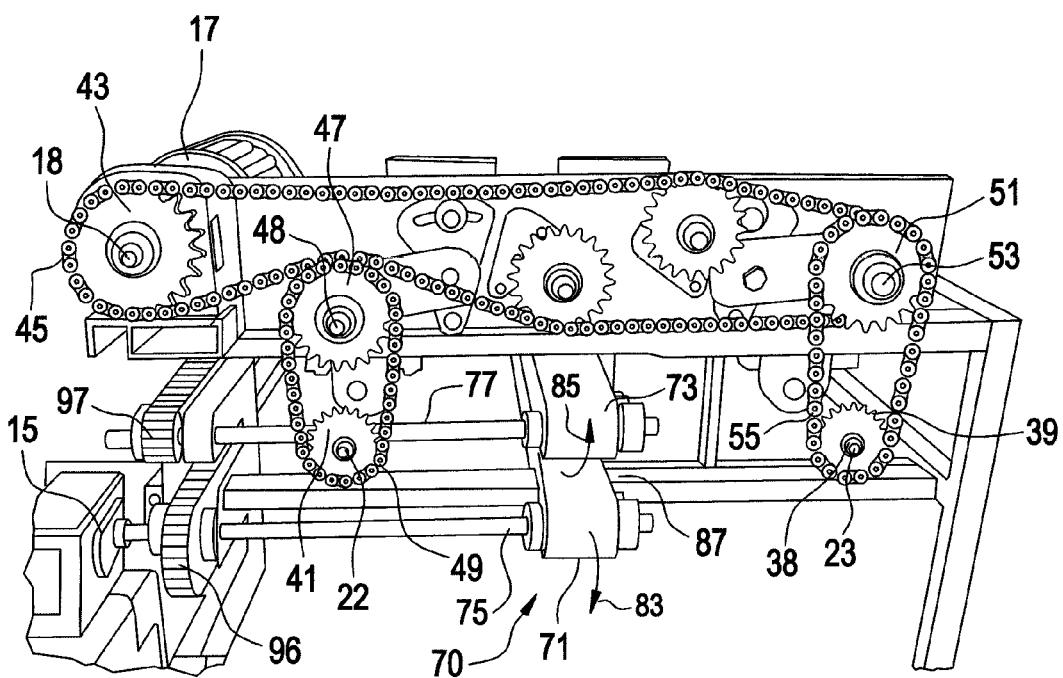
FIG. 6 shows a view similar to that of FIG. 5 but showing the chains that interact with gears to drive the conveyor belt mechanism and the beater mechanism.

As also seen in FIG. 6, the beater 21 has a shaft 22 on which a sprocket 41 is mounted.

Figure 4:
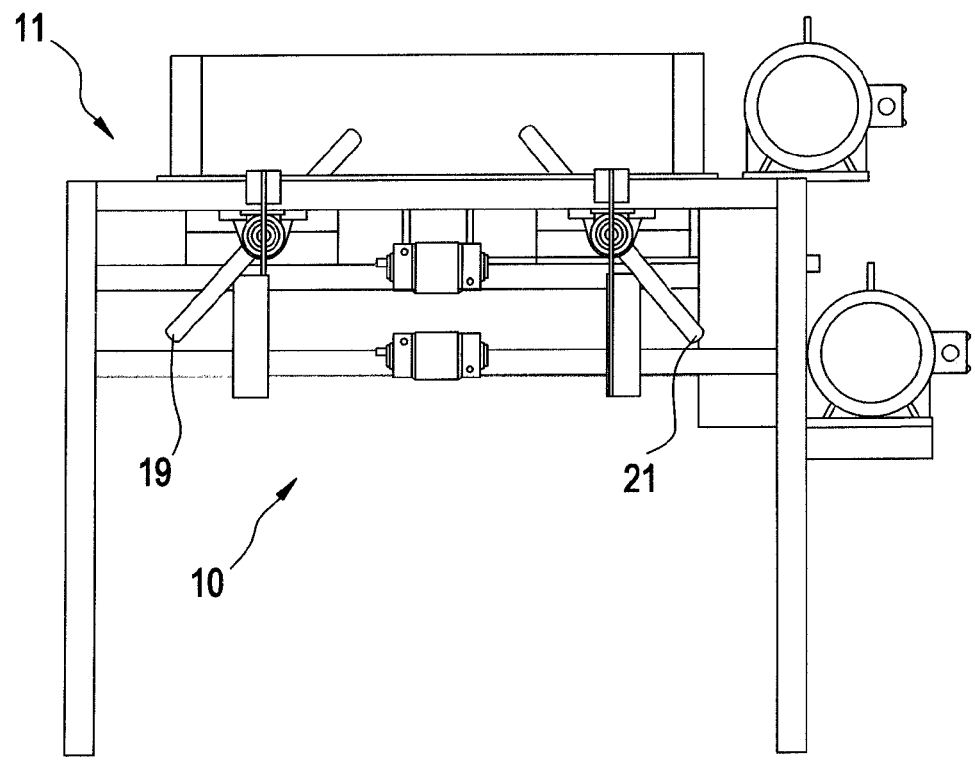
FIG. 4 shows a view from the front of the present invention.
Figure 5:
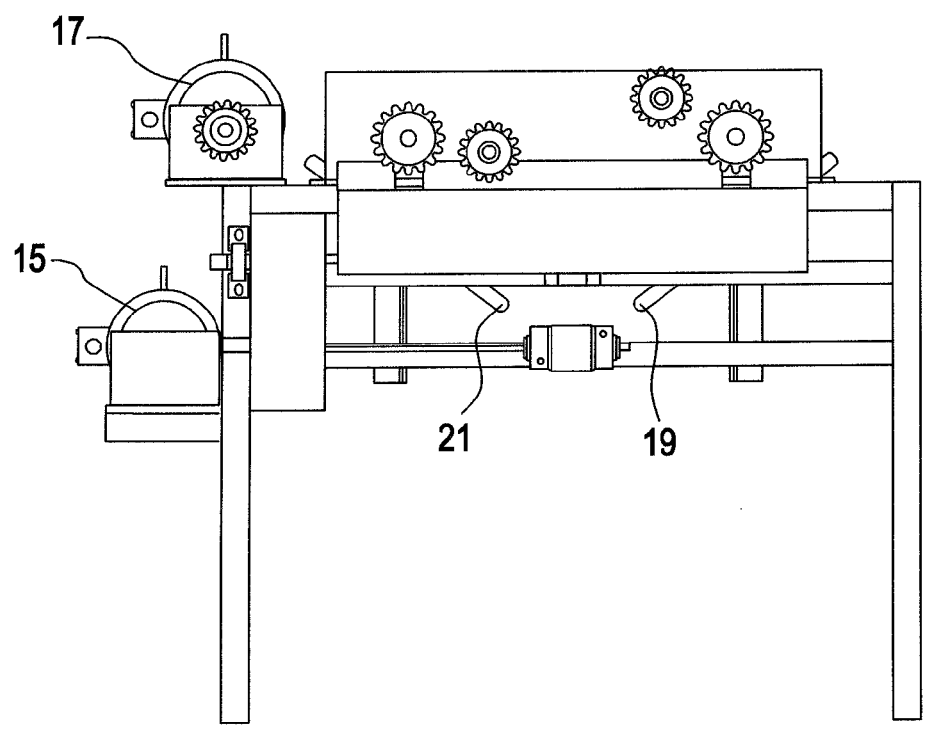
FIG. 5 shows a view from the back of the present invention.

With further reference to FIG. 6, the motor 17 has a drive shaft 18 on which is mounted a drive sprocket 43 that receives a drive chain 45. The drive chain engages the teeth of the double sprocket 47 that is on a shaft 48. Chain 49 rides and enmeshes with sprocket 41. Similarly, the chain 45 enmeshes with the teeth of the double sprocket 51 that rides on a shaft 53 that drives a chain 55 enmeshed with the teeth of the sprocket 39. As should be understood by those skilled in the art, the relationship between the direction of motion of chain 45 and sprockets 39 and 41 causes the beaters 19 and 21 to rotate in opposite directions. This is noted by the arrows 61 and 63 in FIG. 5 which are also shown in FIG. 4.

With further reference to FIG. 6, it is seen that motor 15 includes a drive mechanism that cause movements of gears 96 and 97 in opposite directions. The conveyor mechanism is generally designated by the reference numeral 70 and includes a lower conveyor belt and 71 and an upper conveyor belt 73. The conveyor belt 71 is driven by a lower shaft 75 while the upper conveyor belt 73 is driven by an upper shaft 77. The shaft 75 has a gear 96 mounted thereon which engages another gear 97 mounted on shaft 77. As should be understood from FIG. 6, the gears 96 and 97 are engaged with each other in such a manner that causes rotation of the shafts 75 and 77 in opposite directions. Those opposite directions are shown by the arrows 83 and 85. As should be understood, the space 87 between the belts 71 and 73 is sufficient to allow a pillow 1 (FIGS. 2 and 3) to be inserted between the belts 71 and 73. When the conveyor mechanism is activated, the belts 71 and 73 move in the directions of the arrows 83 and 85 to cause the pillow 1 to move in the direction of the arrow 90 in FIG. 2 with facing surfaces of the belts 71 and 73 moving in the same directions at the same speed. The belts are significantly narrower than the pillow (FIG. 2) such that most of the body of a pillow extends laterally to each side of the belts.

While the pillow 1 is moving in the direction of the arrow 90, the beater mechanism is operating with the beaters 19 and 21 rotating in the directions of the arrows 61 and 63. Thus, for every revolution of each beater 19, 21, the pillow 1 is struck twice, first by the bar 27 and second by the bar 29 in the beater 19 and in the same manner by bars of the beater 21. The bars or rods 27, 29 are preferably diametrically spaced with respect to the shaft 23.

The relationship between the speed of rotation of the bars 19 and 21 and the speed of movement of the conveyor belts 71 and 73 may easily be adjusted through the sizing of the various gears, sprockets and adjustments to the speed of rotation of the motors 15 and 17. For effective distribution of fiber within pillow 1 as it traverses between the beaters 19 and 21, it would be advantageous for the pillow to be struck at least ten times by each beater 19, 21 as it traverses the beaters 19 and 21. Thus, as the pillow 1 moves from one end of the conveyor to the other, in order to be struck ten times by each beater, the beaters must rotate five revolutions each. This ratio may be adjusted as desired.

As particularly seen in FIGS. 1 and 2, the frame 11 also includes two guides 93 and 95 at the entrance of the conveyor belts 71 and 73 to guide the pillow 1 into the center of the machine. The spacing between guides 93 and 95 may be adjusted for various size pillows.

Through use of the present invention, the process of fiber distribution within the pillow shell may be mechanized so that they no longer appear lumpy, that they make the pillow more lofty and softer, evenly distribute the fiber within to fill the shell, and generally make it more attractive to the ultimate consumer. By mechanizing the process, the process becomes less labor intensive and more consistent, thereby bringing down the costs of manufacturing and increasing profits.

As should be understood from the above description, the method of fiber distribution of a pillow includes the following steps:
(1) Providing a mechanism including two counter-rotating beaters;
(2) Providing the device with two conveyor belts that rotate in opposite directions to cause a pillow placed between them to travel in a linear direction;
(3) Conveying a pillow between the conveyor belts with sides of the pillow significantly extending laterally of the conveyor belts while the beater mechanism is operated so that the beaters counter-rotate and strike the sides of the pillow twice for each revolution;
(4) Setting the relationship between the speed of movement of the pillow along the conveyor belts and the number of times the beaters strike the pillow so that the result is a pillow with evenly distributed fiber, no more lumps, loftier, softer, and completely filled (no more dog ears);
(5) Conveying the pillow from the inventive device to a location where it is packaged for sale.

As such, an invention has been disclosed in terms of preferred embodiments thereof which fulfill each and every one of the objects of the invention as set forth above, and provide a new and useful rotary pillow whomper of great novelty and utility.

Of course, various changes, modifications and alterations in the teachings of the present invention may be contemplated by those of ordinary skill in the art without departing from the intended spirit and scope thereof As such, it is intended that the present invention only be limited by the terms of the appended claims.

The invention claimed is:

1. A pillow whomper, comprising:
a) a frame supporting a conveyor mechanism and a beater mechanism, said conveyor mechanism including an upper conveyor and a lower conveyor, said conveyors defining a space therebetween sized to receive a pillow;
b) said conveyor mechanism being movable to move a pillow from one end of said frame toward another end of said frame;
c) said beater mechanism comprising:
i) a rotary beater having a shaft rotatable along an axis of rotation and at least one rod spaced from said shaft;
ii) said beater being laterally spaced with respect to said conveyor mechanism;
d) whereby, while a pillow is conveyed by said conveyor mechanism, said beater rotates and said rod strikes said pillow, thereby substantially uniformly distributing filler within a casing of said pillow.

2. The pillow whomper of claim 1, wherein said conveyors comprise belts narrower than said pillow such that a pillow placed between said belts extends laterally of said belts.

3. The pillow whomper of claim 2, wherein said belts are rotated such that facing surfaces of said belts move in a same direction to convey a pillow placed between said belts in said same direction.

4. The pillow whomper of claim 1, wherein said beater mechanism comprises two beaters, one to each side of said conveyor mechanism.

5. The pillow whomper of claim 4, wherein each beater includes said shaft and two rods lateral of said shaft.

6. The pillow whomper of claim 5, wherein said two rods sequentially strike said pillow as said beater is rotated.

7. The pillow whomper of claim 5, wherein said two rods are parallel to one another.

8. The pillow whomper of claim 7, wherein said rods are parallel to said shaft.

9. The pillow whomper of claim 4, wherein said beaters are simultaneously rotated in opposite directions.

10. The pillow whomper of claim 6, wherein said beaters are simultaneously rotated in opposite directions.

11. The pillow whomper of claim 1, including a first motor driving said conveyor mechanism and a second motor driving said beater mechanism.

12. The pillow whomper of claim 3, wherein said beater mechanism comprises two beaters, one to each side of said conveyor mechanism.

13. The pillow whomper of claim 12, wherein each beater includes said shaft and two rods lateral of said shaft.

14. The pillow whomper of claim 13, wherein said two rods sequentially strike said pillow as said beater is rotated.

15. The pillow whomper of claim 14, including a first motor driving said conveyor mechanism and a second motor driving said beater mechanism.

16. A pillow whomper, comprising:
a) a frame supporting a conveyor mechanism and a beater mechanism;
b) said conveyor mechanism having spaced belts and being movable to move a pillow from one end of said frame toward another end of said frame;
c) said beater mechanism comprising:
   i) a rotary beater to each side of said belts, each beater having an axis of rotation and two rods spaced from said axis of rotation;
   ii) said beaters being laterally spaced with respect to said conveyor mechanism;
d) whereby, while a pillow is conveyed by said conveyor mechanism, said beaters rotate and said rods strike said pillow, thereby substantially uniformly distributing filler within a casing of said pillow; and
e) said conveyor mechanism including an upper conveyor and a lower conveyor, said conveyors defining a space therebetween sized to receive a pillow, said conveyors being narrower than said pillow such that a pillow placed between said belts extends laterally of said belts.

17. The pillow whomper of claim 16, wherein said beaters are simultaneously rotated in opposite directions.

18. A pillow whomper, comprising:
a) a frame supporting a conveyor mechanism and a beater mechanism;
b) said conveyor mechanism being movable to move a pillow from one end of said frame toward another end of said frame;
c) said beater mechanism comprising:
   i) a rotary beater having an axis of rotation and at least one rod spaced from said axis of rotation;
   ii) said beater being laterally spaced with respect to said conveyor mechanism;
d) whereby, while a pillow is conveyed by said conveyor mechanism, said beater rotates and said rod strikes said pillow, thereby substantially uniformly distributing filler within a casing of said pillow; and
e) wherein said conveyor mechanism includes an upper conveyor and a lower conveyor, said conveyors defining a space therebetween sized to receive a pillow.

19. A pillow whomper, comprising:
a) a frame supporting a conveyor mechanism and a beater mechanism;
b) said conveyor mechanism having spaced belts and being movable to move a pillow from one end of said frame toward another end of said frame;
c) said beater mechanism comprising:
   i) a rotary beater to each side of said belts, each beater having an axis of rotation and two rods spaced from said axis of rotation;
   ii) said beaters being laterally spaced with respect to said conveyor mechanism, and wherein each beater includes a central rod along said axis of rotation and two rods lateral of and parallel to said central rod; and
d) whereby, while a pillow is conveyed by said conveyor mechanism, said beaters rotate and said rods strike said pillow, thereby substantially uniformly distributing filler within a casing of said pillow.

20. A pillow whomper, comprising:
a) a frame supporting a conveyor mechanism having two spaced sides, and a beater mechanism;
b) said conveyor mechanism being movable to move a pillow from one end of said frame toward another end of said frame;
c) said beater mechanism comprising:
   i) two rotary beaters, each beater having a shaft rotatable along an axis of rotation and two rods laterally spaced from said shaft;
   ii) said beaters being laterally spaced, one to each side of said conveyor mechanism;
d) whereby, while a pillow is conveyed by said conveyor mechanism, said beaters rotate and said rods strike said pillow, thereby substantially uniformly distributing filler within a casing of said pillow.

* * * * *